(12) United States Patent
Ferris

(10) Patent No.: US 12,539,199 B2
(45) Date of Patent: Feb. 3, 2026

(54) FORCE SENSING TOOTHBRUSH

(71) Applicant: James Ferris, Holden, MA (US)

(72) Inventor: James Ferris, Holden, MA (US)

( * ) Notice: Subject to any disclaimer, the term of this patent is extended or adjusted under 35 U.S.C. 154(b) by 218 days.

(21) Appl. No.: 18/242,650

(22) Filed: Sep. 6, 2023

(65) Prior Publication Data

US 2025/0072994 A1 Mar. 6, 2025

(51) Int. Cl.
*A61C 3/00* (2006.01)
(52) U.S. Cl.
CPC .................................. *A61C 3/005* (2013.01)
(58) Field of Classification Search
CPC ....... A61C 3/005; A46B 5/002; A46B 5/0033; A46B 7/026
See application file for complete search history.

(56) References Cited

U.S. PATENT DOCUMENTS

| | | | | |
|---|---|---|---|---|
| 4,850,074 | A * | 7/1989 | Klevan | A46B 5/0037 15/167.1 |
| 5,144,712 | A * | 9/1992 | Hansel | A46B 11/0003 401/268 |
| 5,146,645 | A * | 9/1992 | Dirksing | A46B 5/0066 15/167.1 |
| 6,327,734 | B1 | 12/2001 | Meginniss, III et al. | |
| 6,560,810 | B1 * | 5/2003 | Jacobson | A46B 5/0033 15/167.1 |
| 7,281,289 | B1 * | 10/2007 | Mirza | A46B 5/0079 15/167.1 |
| 2004/0265038 | A1 * | 12/2004 | Malki | A46B 5/0033 401/183 |
| 2005/0108841 | A1 | 5/2005 | Edwards | |
| 2014/0020198 | A1 | 1/2014 | Slocum et al. | |
| 2017/0143109 | A1 | 5/2017 | Lee | |
| 2017/0239028 | A1 * | 8/2017 | Baek | A46B 5/0045 |
| 2022/0071382 | A1 * | 3/2022 | Kimoto | A46B 5/007 |

FOREIGN PATENT DOCUMENTS

JP 2020103636 A * 7/2020

OTHER PUBLICATIONS

International Search Report, PCT/US2024/045232, Dec. 13, 2024, pp. 1-3.

* cited by examiner

*Primary Examiner* — Nicholas D Lucchesi
(74) *Attorney, Agent, or Firm* — Armis IP Law, LLC

(57) ABSTRACT

A force sensing toothbrush takes the form of a conventional hand-held toothbrush with an integrated capability to determine and alert a user that a proper, effective brushing force is employed. Irrespective of any abrasive medium such as toothpaste and rinse, an often overlooked aspect of brushing is simply the agitation of the brush against the tooth surface and to gingival and sulcus depth for removal of plaque and other soft tooth borne substances. The force sensing toothbrush requires a force of the brush material (typically an array of bristles) against the tooth and gum for determining a range that is effective in dislodging surface and gum lodged contaminants.

7 Claims, 10 Drawing Sheets

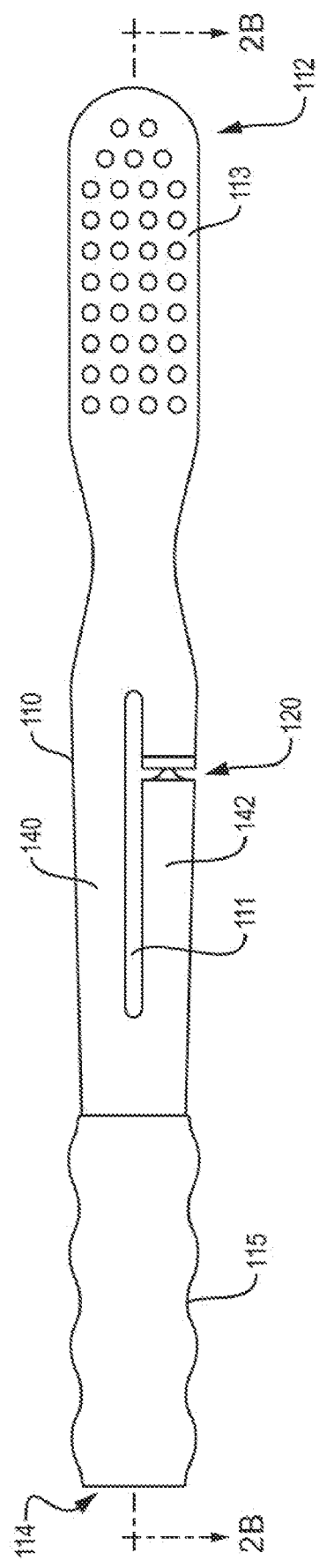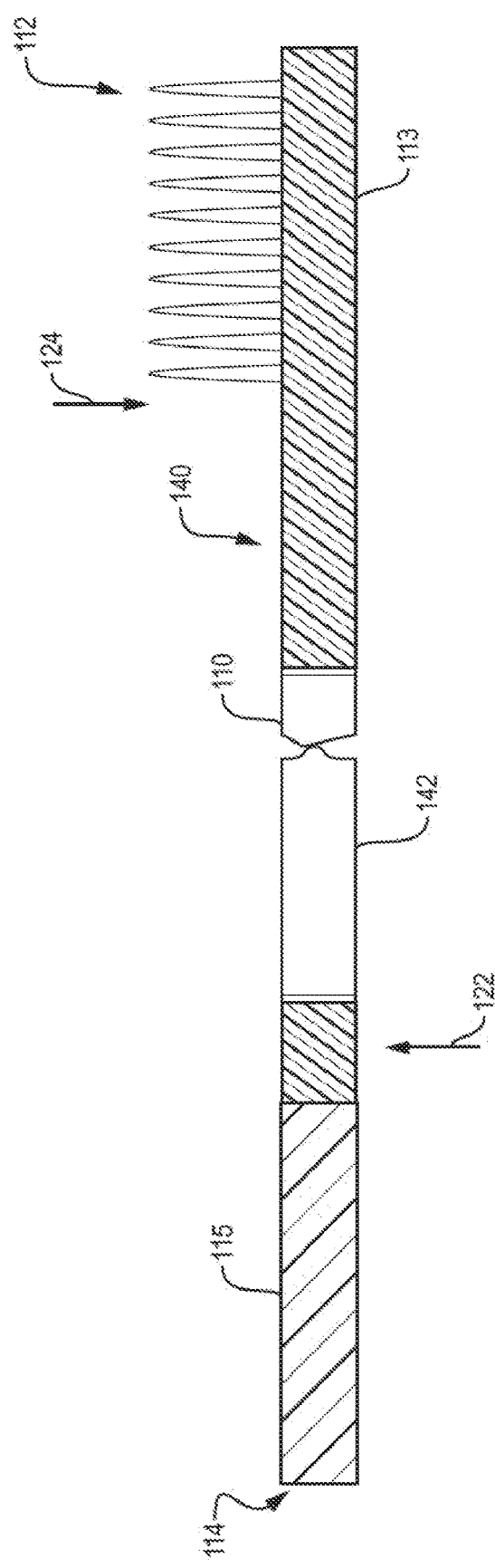
FIG. 2A
FIG. 2B

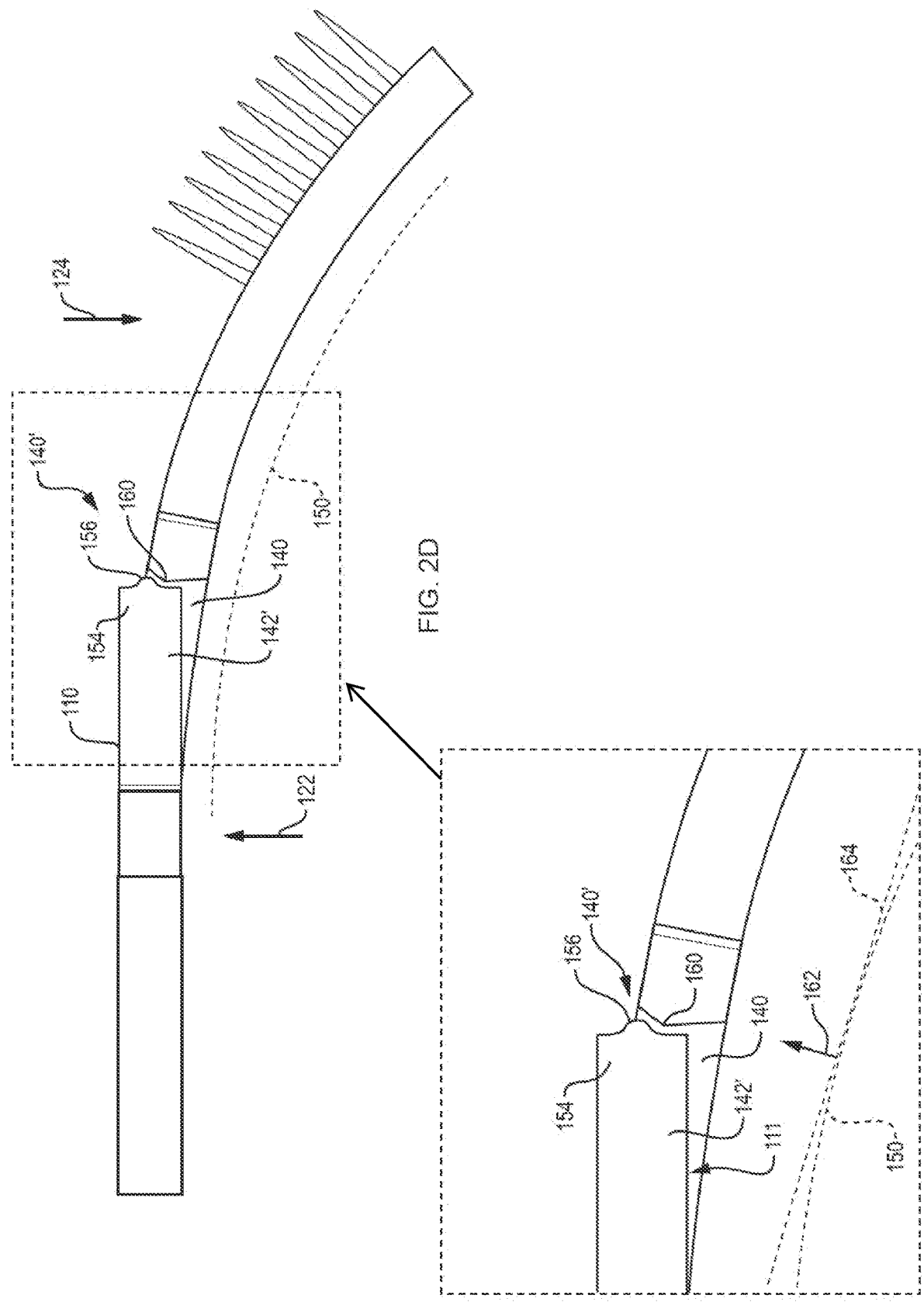

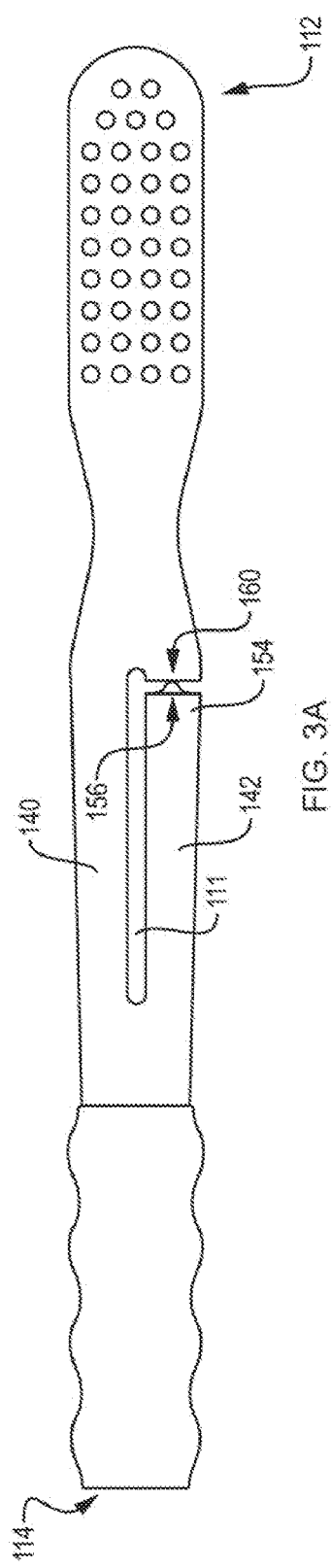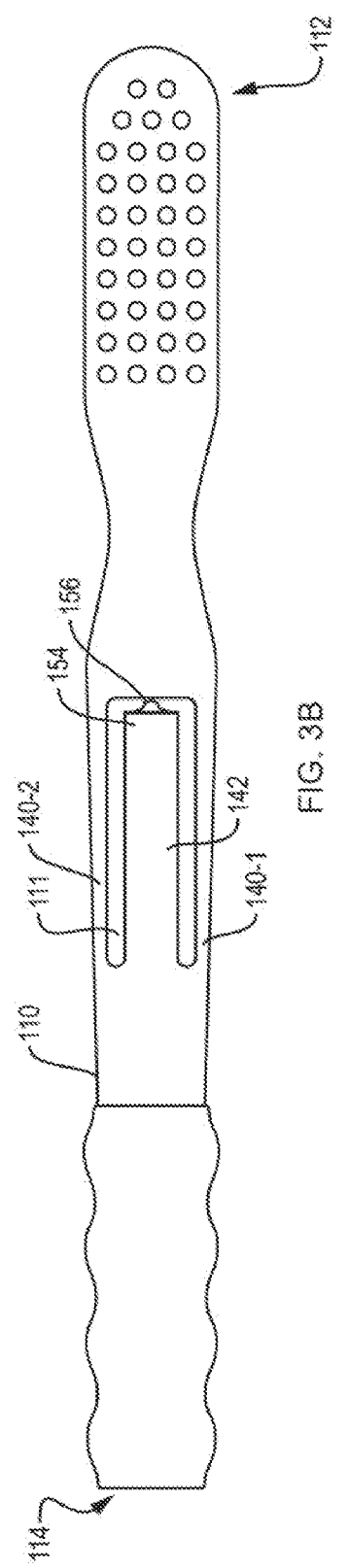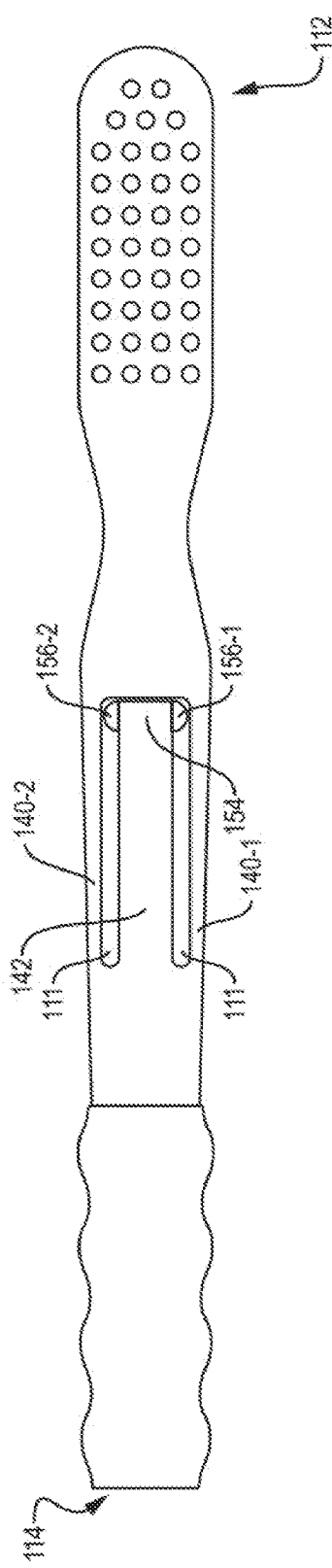

FORCE SENSING TOOTHBRUSH

BACKGROUND

Competent dental care is a benefit of established society that is often taken for granted. Modern dental care accommodates ailments that decades ago would have been debilitating and chronically painful. Preventative care, in particular, is often touted as a easy and assured means to healthy teeth and gums. Commercialization efforts of dental care products portray proper care as simple as choosing the correct toothpaste, rinse, or floss brand, however, toothpaste alone does not remove plaque. The bristles delivering the toothpaste disrupt or remove plaque, rendering toothpaste to simply the foamy, minty reward sought by many.

Concomitantly, rinses are simply a minty reward. Misleading advertising claims of "loosening plaque" may only be slippery claims to entice sales. E.g . . . , "can help, should help, etc." but do not actually help significantly. The only rinse that removes dental plaque has chlorhexadine, to be used for hospitalization, and only for patients who can't toothbrush themselves. That is because chlorhexadine (chx) only works for 7 days, after which the bacteria that form plaque become desensitized, rendering the rinse useless for plaque removal. Dental floss, any type or style is effective for plaque removal, and is mostly effective between the teeth. Proper brushing will cover most of this tooth surface area, rendering flossing to a very secondary status.

SUMMARY

A force sensing toothbrush takes the form of a conventional hand-held toothbrush with an integrated capability to determine and alert a user that a proper, effective brushing force is employed. Irrespective of any abrasive medium such as toothpaste and rinse, an often overlooked aspect of brushing is simply the first contact of the brush bristles against the tooth surface and edge of gum line for removal of plaque and other tooth/gum borne soft materials (materia alba). The hardened substance (calculus/hardened plaque) that forms on tooth surface and under gum line in the sulcus/pocket adheres strongly to the tooth and needs a relatively strong pressure to scrape/chip away to prevent future gum disease/tooth loss. A toothbrush alone may be ineffective for calculus removal, effective for precursor/plaque removal.

The disclosed force sensing toothbrush, when activated, by force of the brush material (typically an array of bristles) against the tooth/gum edge determines an effective range to dislodge the soft materials from tooth surface and gum line (gingival) sulcus.

The manual contact of the brush against the tooth surface provides for removal of plaque and other tooth borne material (no hardened substances/calculus) from the sulcus, a region formed between the tooth and upper gum forming a pocket or groove as the gum meets the tooth just below the gumline.

The force sensing toothbrush dislocates when the manual force of the brush material (typically an array of bristles) applied against the teeth and gums by issuing an audible, tactile, mechanical and/or visual sign for determining a range that is effective in dislodging soft surface contaminants from the sulcus and teeth. It should be noted that if the gums have receded the root below the toother enamel will show, and still have gum attachment with the sulcus, in contrast to a healthy gum and enamel structure.

The mechanical "feel" of the brush is typically a better perceived indicator than the sound, which may be subject to compromise from device wear.

Configurations herein are based, in part on the observation that conventional approaches to dental care rely on manual control and direction of an agitating device, or toothbrush, for removal of plaque and stimulation of gum tissue. Unfortunately, conventional approaches to toothbrush use suffer from the shortcoming that conventional toothbrushes provide no indication or control over the manual force applied to the tooth via the brush. Such conventional approaches rely only on user perception of brushing force, and often result in improper or inadequate brushing force against the teeth. Accordingly, configurations herein substantially overcome the shortcomings of conventional toothbrush use by sensing force applied against the teeth by the brush and issuing an audible, mechanical or visual signal indicative of sufficient or optimal brushing force. The signal is based on a threshold of sufficient force, and upon application of the brush attaining the threshold force against the tooth surface, a clicking, vibration or similar annunciator sound emanates.

In further detail, the force sensing toothbrush device includes an elongated frame forming a body of the toothbrush, and having a distal end and a proximal end, and a handle at a proximal end of the elongated frame, where the handle is adapted for gripping by a user. A brush at a distal end of the elongated frame is adapted for abrasive engagement with teeth, and an interference region between the proximal and distal end is adapted to generate a signal responsive to a pressure exerted on the brush.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

FIGS. 2A-2D are a schematic view of the toothbrush of FIG. 1;

FIGS. 3A-3C are top or plan views of configurations of the toothbrush of FIGS. 1-2D;

DETAILED DESCRIPTION

Figure 1:
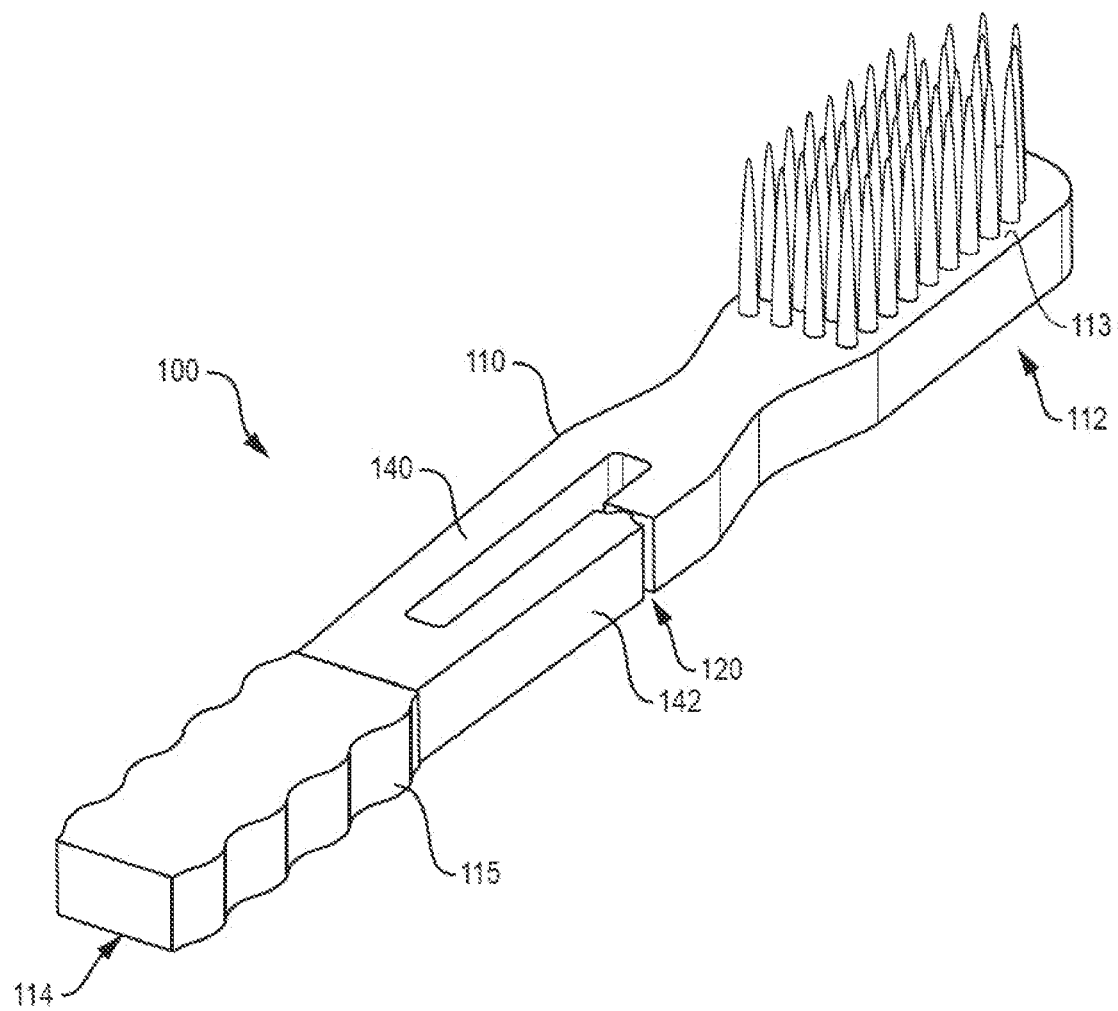
FIG. 1 is a perspective view of the force sensing toothbrush as disclosed herein.

The description and examples below illustrate a force sensing toothbrush for detecting and annunciating a signal indicative of brushing technique exhibiting optimal force for dislodging plaque and other pathogens or soft deposits on a tooth surface, particularly near and below the gumline.

The disclosed toothbrush device includes an elongated frame having a distal end and a proximal end. A handle at a proximal end of the elongated frame is adapted for gripping by a user, and a brush at a distal end is adapted for abrasive engagement with teeth. A pressure sensing region between the proximal and distal end defines a linkage having a deformation or hinging movement responsive to the force applied by the handle against the toother surface.

In a typical progression of gum degradation, as gums recede below enamel edge the root (dentin/cementum) shows and can be initially quite sensitive or painful when contacted by temperature, sweets, acids, etc. When any stimulus is applied to tooth root, tooth response is only pain. Unwitting patients may scrub the teeth/gums so vigorously/strongly, that it causes the gum line to start to recede permanently, exposing the root surface. Unfortunately, instead of seeing a dentist, a typical consumer may now buy "tooth sensitive toothpaste," which may have a short term beneficial effect. However, with a diminishing pain response, the patient can now continue their deleterious brushing, possibly exacerbating the gum health for future costly periodontal (gum) surgery.

Accordingly, the disclosed brush device will help prevent this for many people. As in once annunciated by the device, no more excessive force need be required or used.

In a particular configuration, the pressure sensing region includes a continuous portion and a parallel discontinuous portion, such that the continuous portion is configured to deform out of alignment in response to the pressure against the brush. The slight flexure, or deformation, of the applied brush force causes the continuous portion to deform, or bend to slightly misalign with the discontinuous portion. A moderate interference engagement between the discontinuous portion, typically a slight overlap or contact with the frame, results in a sudden breakaway and release of force at a sufficient degree of deformation or bend. The continuous and discontinuous portions are parallel and aligned when the brush is at a rest position. The continuous portion may form the center of the elongated frame, flanked by opposed discontinuous portions. As the discontinuous portion extends straight from the handle, the continuous portion bends away, forming a slight arc, as deformative pressure results from the brush against the tooth.

The application of force and determination of an optimal force is based on an ability of the brush bristle to deform and extend into the sulcus for dislodging plaque and other pathogens that may reside in the sulcus and tooth proximity. Conventional brushing approaches elude the sulcus because it is a potential space (like a pants pocket, not realized until something is inserted) concealed behind the uppermost portion of the gum, defining a healthy/normal depth of zero (0) to four (4) millimeters. Depth is measured to attachment of gum tissue to tooth surface and crest of bone. This depth is adequately cleansed by proper brushing. Any greater depth may require dental treatment to correct dental "pockets.".

User feedback results from an annunciator responsive to generate an audible and/or tactile signal in response to the deformation attaining and/or exceeding a threshold. The threshold defines a minimum force for effective agitation of the surface contaminants such as plaque. The annunciator forms from a tip at an end of the discontinuous portion, such that the tip is adapted to generate percussion sounds from movement against the frame upon attaining the threshold deformation force. A modest vibration or force as the discontinuous portion breaks past the stationary frame. In other words, a tab or protrusion of the discontinuous portion engages a lip of the continuous portion and generates an audible "click" sound and generates a perceptible vibration as the tab is forced past the lip. Alternatively, an electronic or magnetic displacement sensing may be employed for detecting the relative movement and misalignment between the continuous and discontinuous portions.

In this manner, a low cost improvement in a similar form factor as a conventional toothbrush provides an audible indication of application of effective brushing force. The proper amount of force causes the flexible brush bristles to deform or bend against the surface of the tooth to extend into the sulcus for gentle dislodgement of material therein. Mere agitation of the visible tooth enamel is insufficient to prevent gum disease because accumulations of plaque and calculus in the sulcus will remain. It should be noted that bleeding gums may require extra force on the brush to heal. This may cause pain and bleeding when starting to cleanse. If continued correctly, the gums return to normal in about 7-10 days with no permanent damage.

FIG. 1 is a perspective view of the force sensing toothbrush as disclosed herein. Referring to FIG. 1, the general arrangement of the force sensing toothbrush device 100 as defined herein is shown including an elongated frame 110 having a distal end 112 and a proximal end 114. A handle 115 at the proximal end of the elongated frame 110 is adapted for gripping by a user. A brush 113 at the distal end of the elongated frame is adapted for abrasive engagement with teeth. Force sensing and annunciation are provided by an interference region 120 between the proximal 114 and distal end 112, where the interference region 120 is adapted to generate a signal responsive to a brushing pressure exerted on the brush.

FIGS. 2A-2D are a schematic view of the toothbrush of FIG. 1. Referring to FIGS. 1 and 2A-2D, the brushing forces exerted on the interference region 120 are shown. During a brushing operation, the frame 110 exerts the pressure against the teeth at the distal end 112 from user movement and brushing force, tending to drive the brush 113, typically nylon bristles or other agitator or abrasive member, against the tooth enamel, The frame 110 is typically a semi-rigid but deformable plastic or polymer material, which deforms away from the tooth surface in response to a brushing force 122, resulting in a response force 124.

Figure 2C:
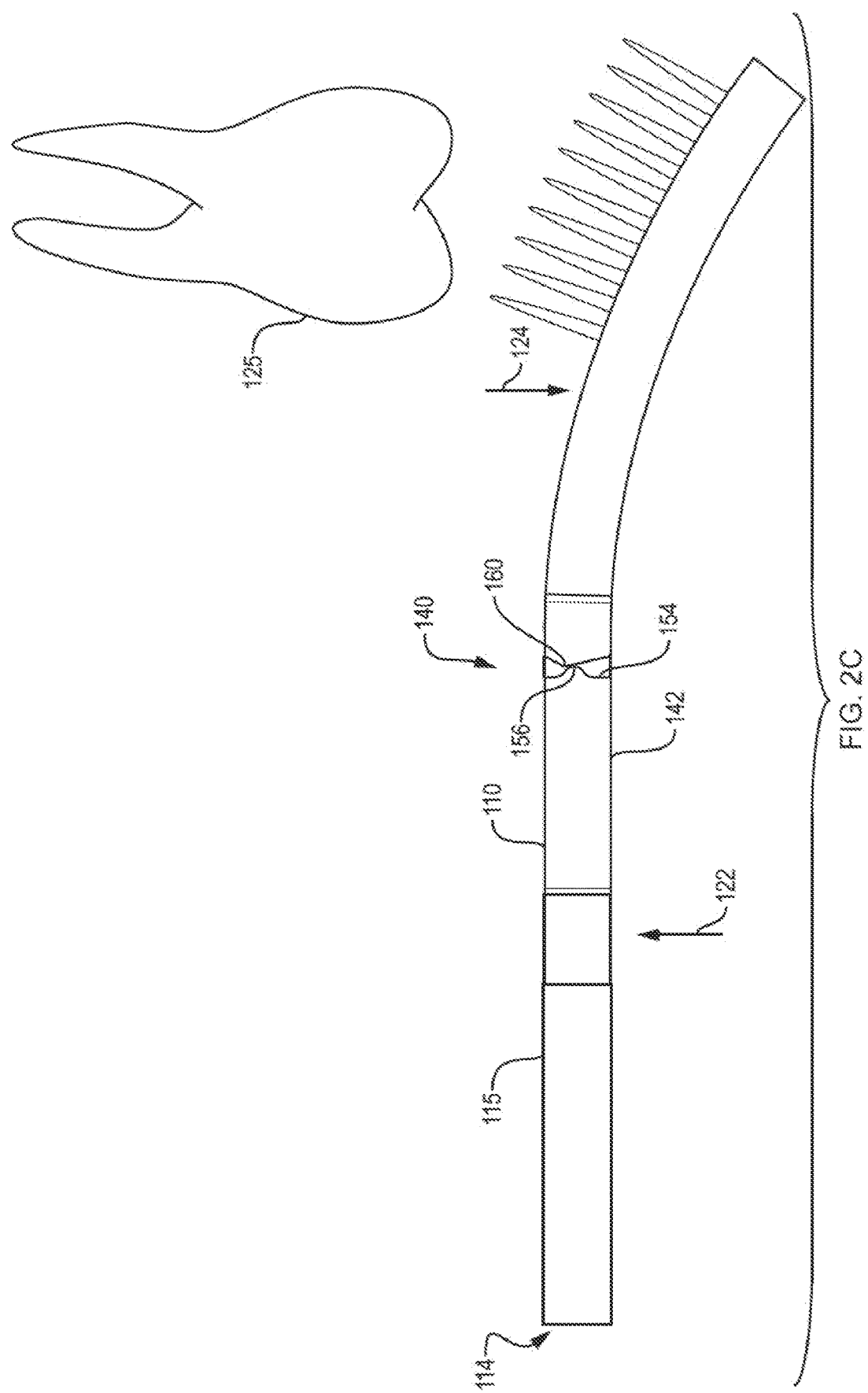

The interference region 120 includes a continuous portion 140 and a parallel discontinuous portion 144 along the frame 110, generally defined by longitudinal segments of the frame 110 separated by a gap 111 allowing for independent movement, shown in FIG. 2B. The discontinuous portion 142 is configured to deform out of alignment with the continuous portion 140 from the response force 124 against the brush 113 from teeth 125 contact, shown in FIG. 2C. As the brushing pressure 122 forces the brush 113 against a tooth surface, deformation of the frame 110 in response to the response force 124 imposes an arcuate form defined by arc 150 on the frame. The arc 150, or simply bending of the frame 110, tends to form a response in the discontinuous portion 142. The separate, discontinuous portion 142 tends to remain in a resting, or "straight" form as the continuous portion 140 deviates according to the arc 150. The same deviation pulls the discontinuous portion 142 away from the frame 110 as the discontinuous portion follows a tangent to a circle defined by the arc, resulting in drawing the discontinuous portion 142 onto a larger circumference circle than a circle 152 defined by the continuous portion 140.

FIG. 2C shows the formation of the arc 150, and FIG. 2D shows the misalignment of the discontinuous portion 142' as the force 124 of the deformation overcomes the interference force maintaining the discontinuous portion 142 in alignment. The discontinuous portion 142 triggers an annunciator for originating a signal indicating a threshold brushing force has been attained. In operation, this threshold force is based on a brush force sufficient and optimal for dislodging plaque and other pathogens in the sulcus and on the tooth surface.

In the example of FIGS. 2A-2D, the annunciator includes a percussion tip 154 at an end of the discontinuous portion 142, such that the percussion tip is adapted to generate percussion sounds from movement against the frame upon attaining a threshold deformation force. The percussion sound is typically a "click" or "snap" as the percussion tip 154 passes forcefully out of an interference fit with the frame 110. In general, the annunciator is adapted to generate the signal based on sudden disengagement of the discontinuous portion 142 from alignment and/or interference retention with the frame. Electronic or optical communication, for example, may also detect the misalignment, such that the annunciator is adapted to detect a loss of contact of the discontinuous portion.

The percussion tip 154 typically has a protrusion 156, and may engage a ridge 160, such that the percussion tip 154 is configured to slidably pass the ridge 160 upon attaining the threshold deformation force. The protrusion and the ridge are adapted to deform for overcoming the interference engagement upon attaining the threshold force. The percussion tip 154 is adapted to generate percussion sounds from movement against the frame upon attaining the threshold deformation force.

The ridge 160 resides on an opposed surface 140' of the interference region and retains the discontinuous portion 142 in alignment by interference of the ridge 160 with the percussion tip 154 until the threshold force is attained, forcing the percussion tip 154 past the ridge 160. The frame 110 deforms in an arcuate manner forming a concave shape on the continuous side 111 from the pressure exerted by the brush, where the deformation increases a distance between the protrusion 156 and the ridge through radial elongation and/or deformation of the discontinuous portion 142 of the frame 110.

Continuing to refer to FIGS. 2A-2D, the applied force 122 generates deformation and response forces 124 in the frame 110. Deformation of the continuous portion 140 defines the arc 150, such that the deformation forces the discontinuous portion 142 outward from a circle defined by the arc 150 (such a circle extrapolates from the arc 150). The percussion tip 154 of the discontinuous portion follows an outward force normal 162 to a tangent 164 to the circle.

FIGS. 3A-3C are top or plan views of configurations of the toothbrush of FIGS. 1-2D. Referring to FIG. 3A, the continuous portion 140 resides adjacent the discontinuous portion 142 subdividing the frame longitudinally approximately mid-width of the frame 110 from gap 111. FIG. 3B shows an alternate configuration with the continuous portion having two parallel segments 140-1 . . . 140-2 (140 generally) flanking the discontinuous portion 142. The percussion tip 154 locates the protrusion 156 extending longitudinally towards the non-deforming portion 158 of the frame 110. FIG. 3C shows a further extension where the percussion tip 154 has multiple protrusions 156-1 . . . 156-2 (156 generally) extending normal or perpendicular to the longitudinal dimension of the frame 110.

Device usage for the method of hygienic tooth care includes affixing an agitator or brush 113 to the distal end 112 of an elongated frame 110 having a proximal end 114 including a handle 115, such that the agitator is adapted for abrasive engagement with teeth. Usage disposes the agitator against a tooth enamel surface for extending the bristles into the sulcus from the force 122 applied at the handle, resulting in deforming the frame in an arcuate manner in response 124 to the force 122. This actuates the interference region 120 between the distal end 112 and the proximal end 114 for misaligning the discontinuous portion 140 of the frame 110, such that the discontinuous portion 140 is retained in an interference engagement with the frame 110 until the force 122 attains the deformation force threshold for disposing the discontinuous portion 140 out of alignment with the frame 110.

By way of background, plaque is microscopic (3 to 5 bacteria thick) mucopolysaccharide film of a generally clear appearance and brittle texture. It becomes visible when stained with a disclosing solution. This physical property dictates removal technique. Once broken/shattered by effective brushing force, dislodged portions do not restick but float away with saliva/water. It requires about 24 hours for a new layer to form. Only a slight pressure is required, but it must be physically agitated, hence the need to direct the brush bristles into the sulcus from deformation against the tooth enamel.

Excessive pressure or agitation does not facilitate once plaque is already broken. Pictures of stained plaque often reveal how the entire tooth is not stained, but only the portion just above the gum line. Basically, a common brushing approach cleans the part of the tooth that's already clean and misses the needed areas below the gumline in the sulcus. Unfortunately, there is a tendency for some is then to deleteriously scrub excessively, leading to permanent gum recession and exposed tooth root surface which can be painful.

Leaving plaque in place will result in calcium salts hardening the plaque, which is typically known as "calculus/tartar". This is a hard microscopic film that grows by layering/apposition. If not removed will keep enlarging, straining the gum line causing permanent bone loss, eventually loosening teeth.

Most chemical rinses are ineffective to remove plaque, except for chlorhexadine (chx). However, it only works for one week before the bacteria becomes desensitized and the chx is rendered useless. Chx should only be used in hospitals where rinsing will have positive, short term effect.

Figure 4A:
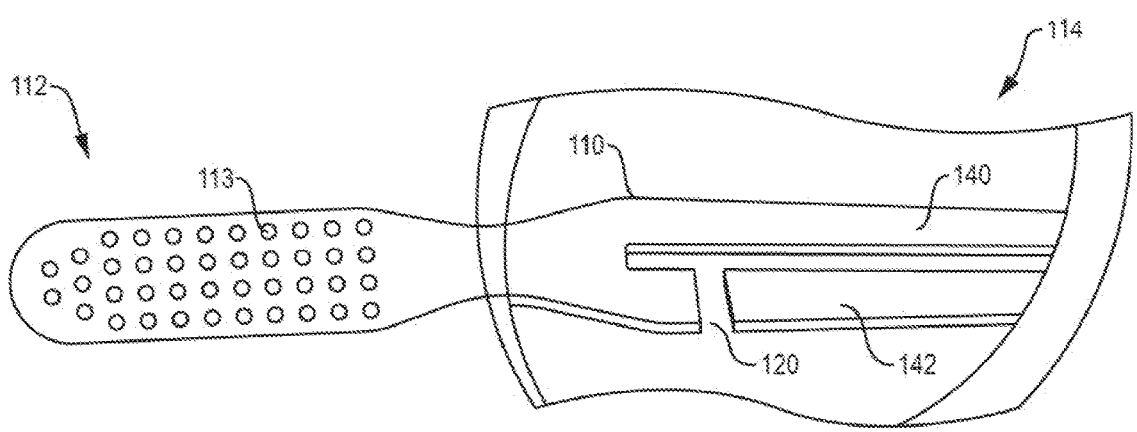
FIGS. 4A-4E are prototype renderings of the device of FIGS. 1-3C.
Figure 4B:
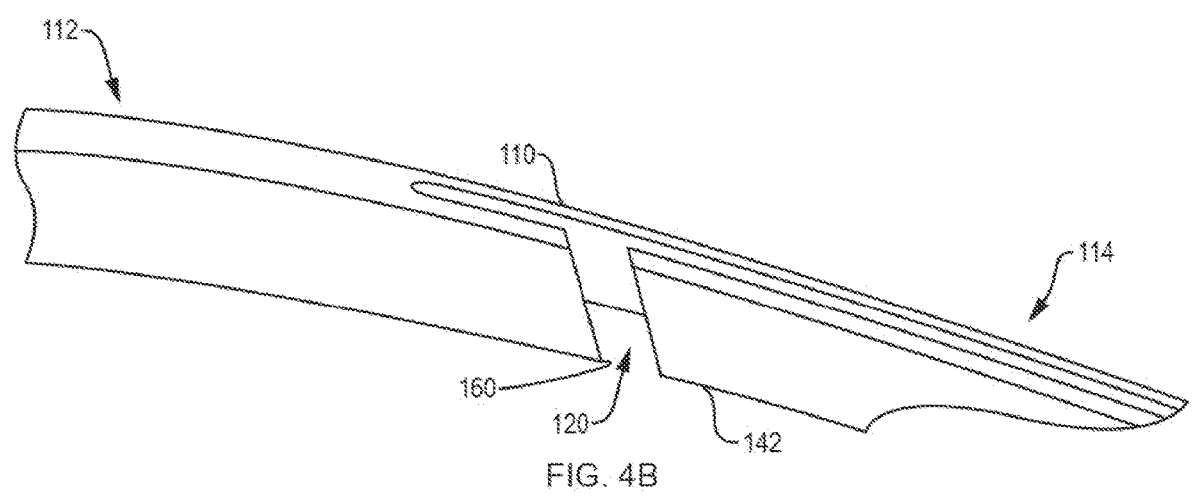
Figure 4C:
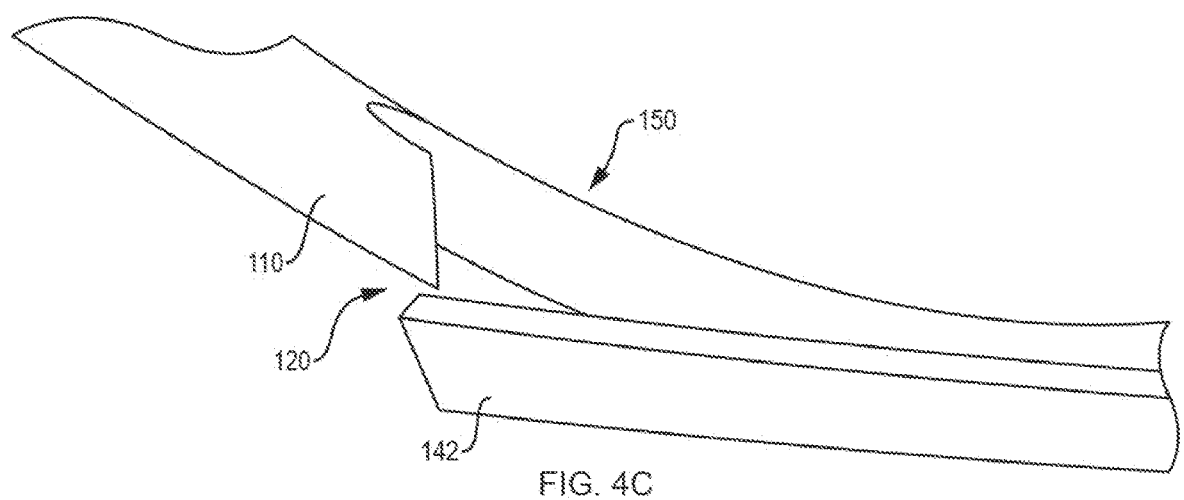
Figure 4D:
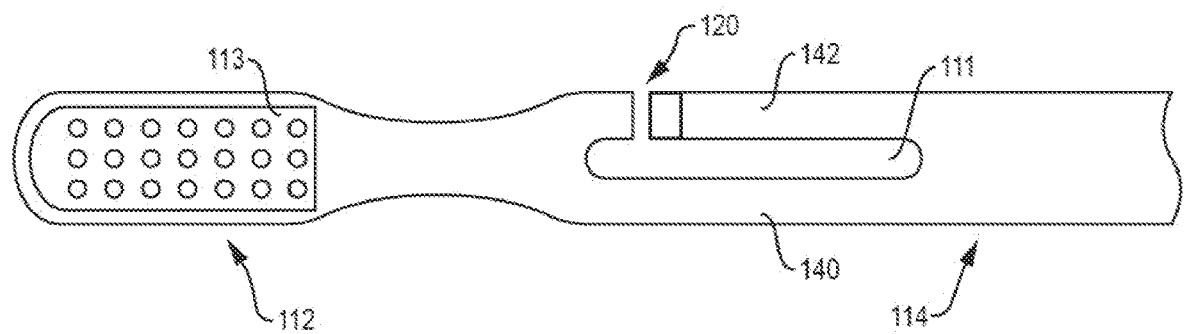
Figure 4E:
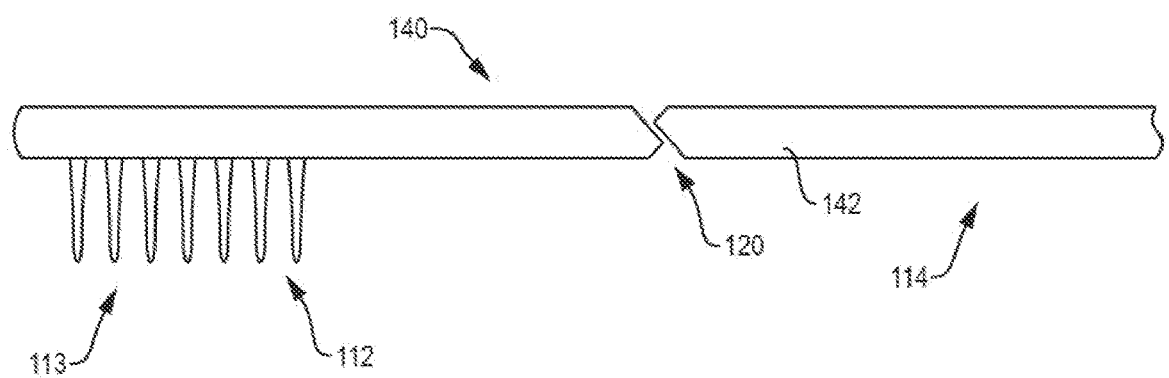

FIGS. 4A-4E are prototype renderings of the device of FIGS. 1-3C. Referring to FIGS. 1-4C, the approach of FIGS. 1-3C is implemented in a prototype toothbrush. Referring to FIGS. 1-4C, FIG. 4A shows an interference region 120 formed by removing material from the frame 110. FIGS. 4D-4E depict a dimensional drawing showing tolerance and scale in a particular configuration. The mechanism is about a ⅜ inch long portion of the frame, and FIG. 4E shows a cut angle of approximately 50 degrees.

Figure 5A:
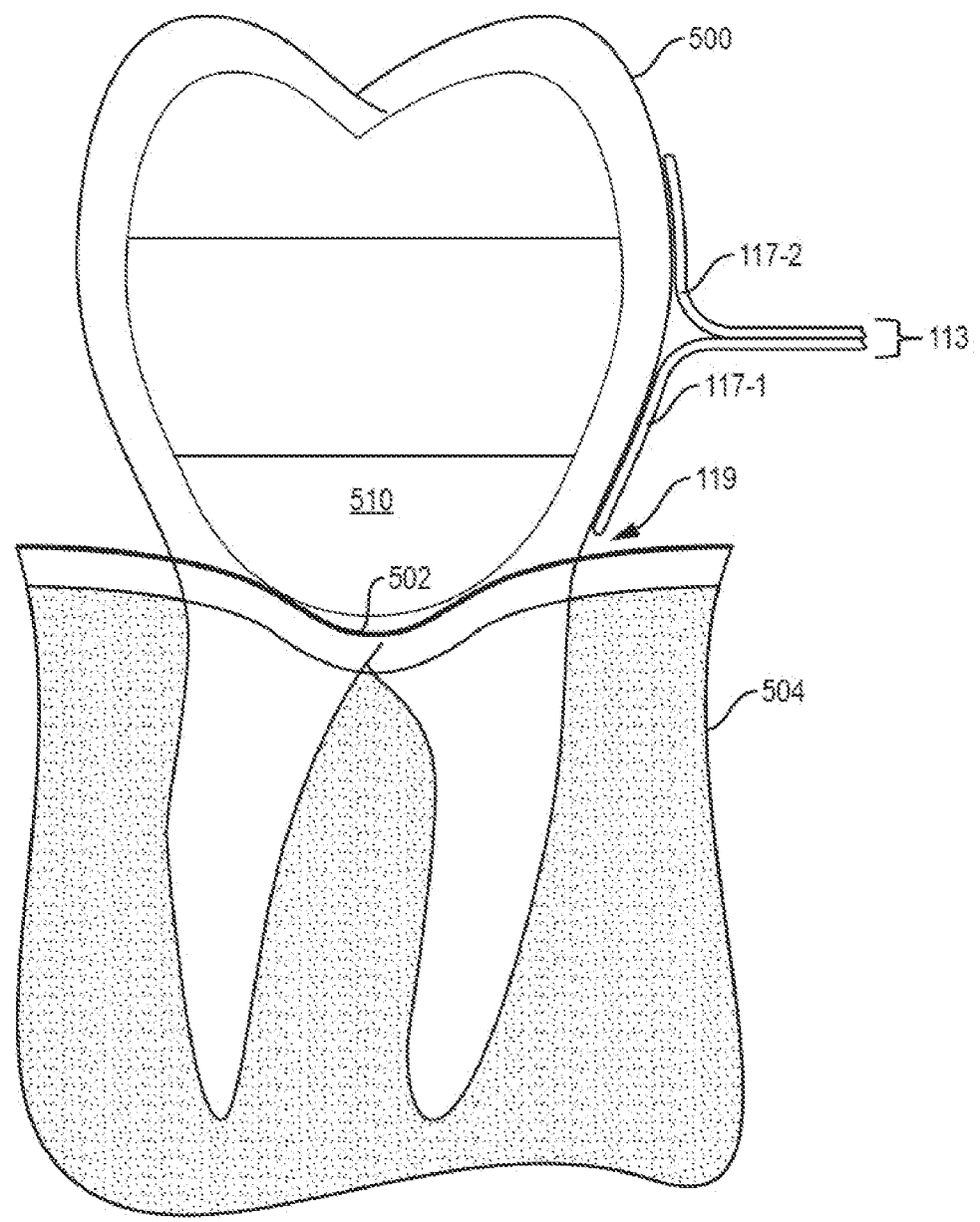
FIGS. 5A-5D are anatomical diagrams of teeth and gums affected by the disclosed approach.
Figure 5C:
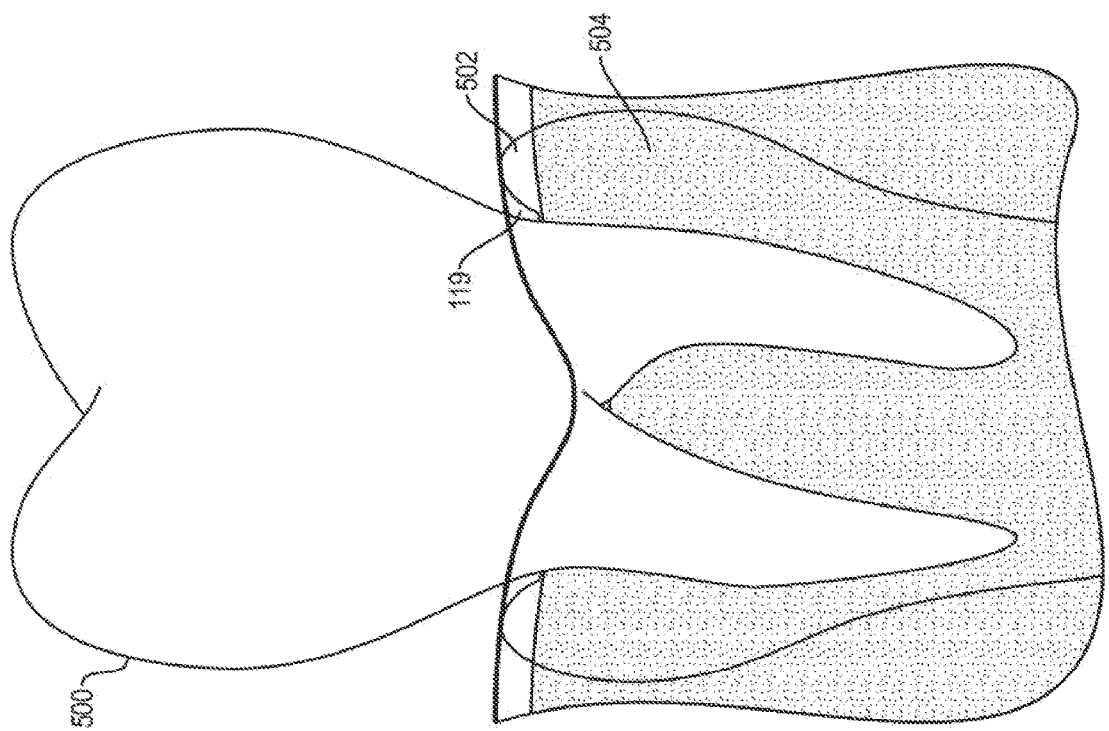
Figure 5B:
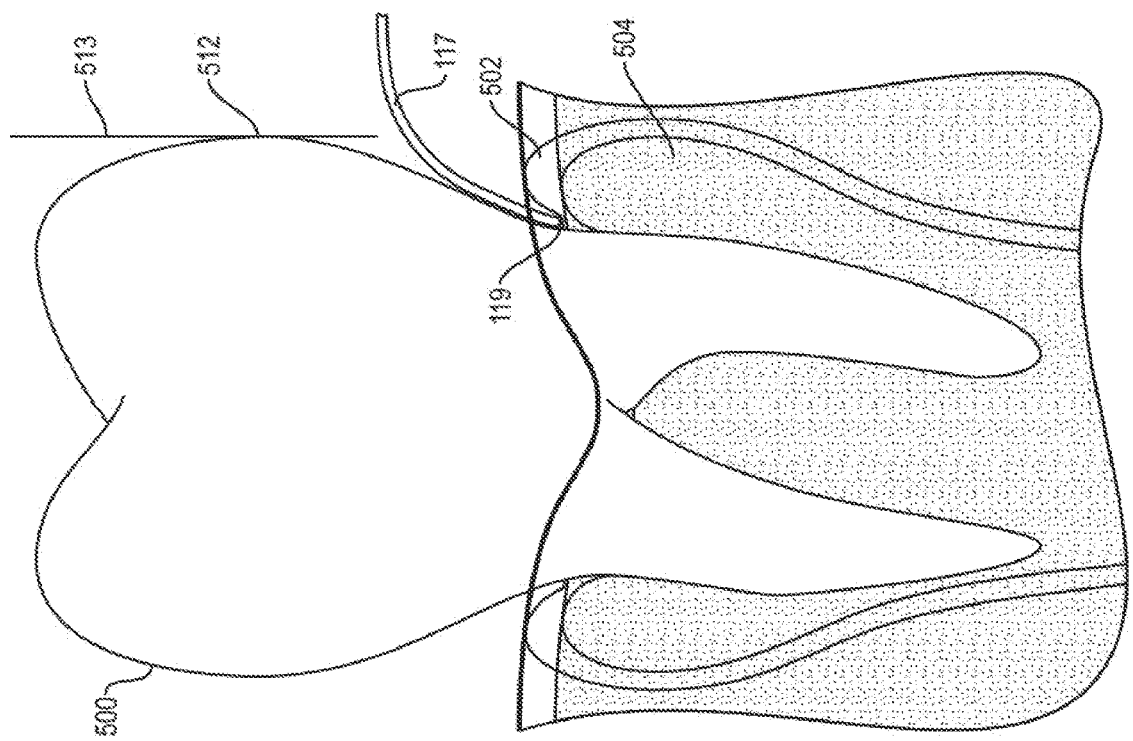

FIG. 5B shows the discontinuous portion 142 potentially blocked at the interference region. FIG. 5C shows sufficient deformation to overcome the interference of the ridge 160 or end of the frame 110, as the arc 150 pulls and forces the deformation of the discontinuous portion 142.

FIGS. 5A-5D are anatomical diagrams of a tooth 500 and gums 502 affected by the disclosed approach. Referring to FIGS. 1-5D, in 5A, the sulcus 119 is defined by the pocket or groove between the lower portion 510 of the tooth adjacent the gum 502 and above the bone 504 anchoring the tooth 500.

The brush 113 includes a plurality of bristles 117-1 . . . 117-N (117 generally). Each bristle is formed from a flexible material, typically nylon. The bristle 117 tends to deform when appropriate force applies the bristle 117 against the tooth, causing it to deform and curve in approximately perpendicular orientation extending parallel to the tooth 500 surface. At least some of the bristles 117-1 will tend to deform downwards into the sulcus 119 for agitating plaque and other material. Some bristles 117-2 may extend upwards or in other directions, depending on angular variations in the user applied force, however given the large number of bristles 117-N on the brush, at least some bristles 117 should extend into the sulcus. As described above, only a slight force is needed to dislodge plaque.

FIG. 5B shows an approaching bristle 117 contacting the tooth 500 below a line 513 to a tangent 512 to the tooth surface. Bristles below the tangent 512 point will tend to drive down into the sulcus 119. FIG. 5C shows an alternative view of the sulcus 119 emphasizing the gap between the tooth 500 and gum 502.

Figure 5D:
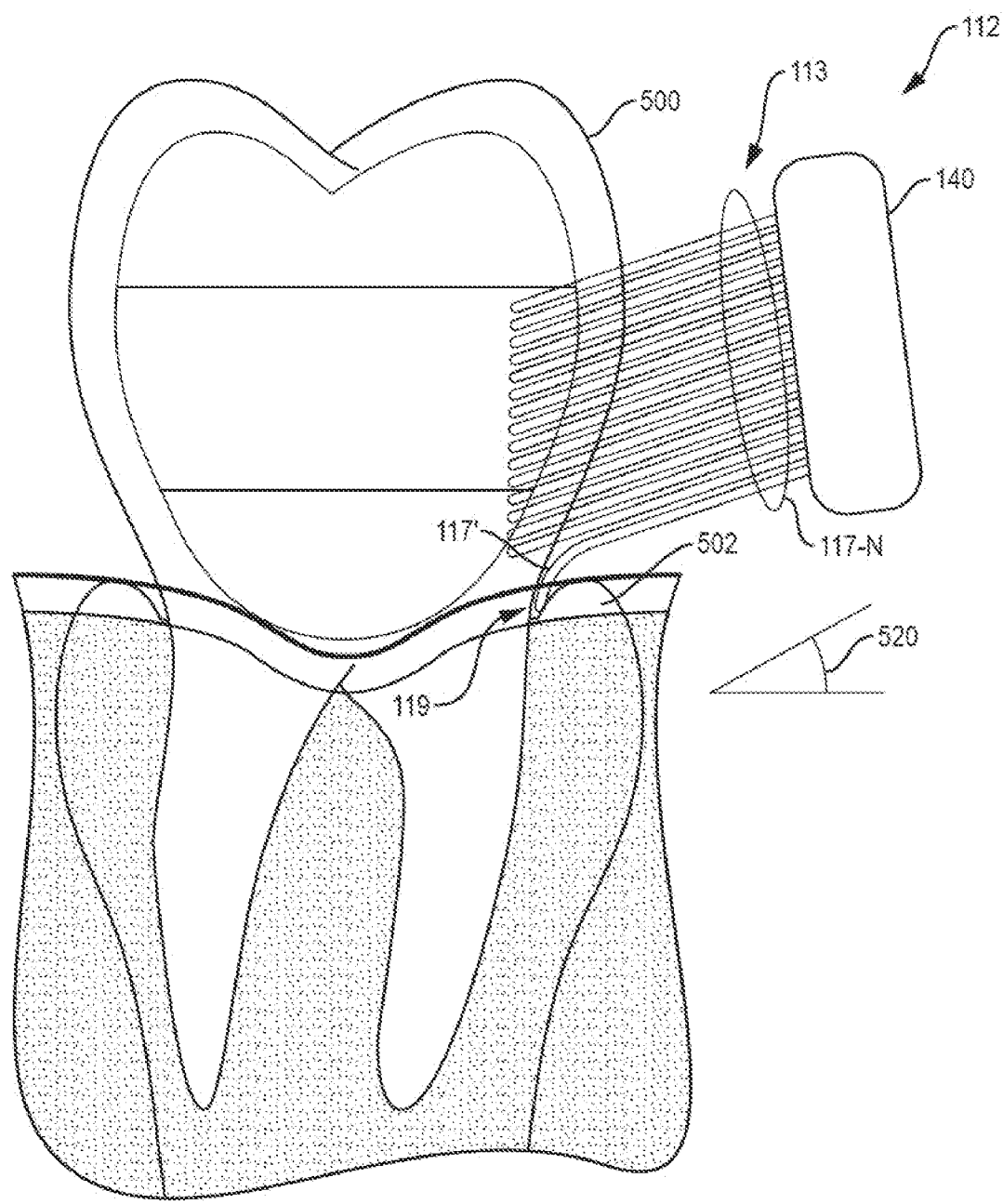

FIG. 5D shows a configuration of semi-rigid bristles 117 that tend to maintain a straight orientation while angled to deform and attain the depths of the sulcus 119. In an extension of FIG. 5A, which illustrates substantial deformation of the bristles 117, the bristles 117-N can extend into the sulcus 119 with only moderate bending 117' from an optimal brush 113 angle. A brush 113 directed at about a 45°-60° angle 520 from a gum horizontal is sufficient to reach the sulcus and any associated contaminants.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A force sensing toothbrush device, comprising:
    an elongated frame having a distal end and a proximal end;
    a handle at the proximal end of the elongated frame, the handle adapted for gripping by a user;
    a brush at the distal end of the elongated frame, the brush adapted for abrasive engagement with teeth; and
    an interference region between the proximal and distal end, the interference region adapted to generate a signal responsive to a pressure exerted on the brush, the interference region including a continuous portion and a parallel discontinuous portion, the discontinuous portion configured to deform out of alignment in response to the pressure exerted on the brush;
    a percussion tip having a protrusion at an end of the discontinuous portion,
    the percussion tip defining an annunciator responsive to generate an audible or tactile signal in response to the deformation, and adapted to generate percussive feedback of sounds or movement against the frame upon attaining a threshold deformation force,
    the frame adapted to deform in response to the pressure exerted on the brush,
        the deformation biasing the discontinuous portion against a ridge, the protrusion maintained in an interference engagement with the ridge until the threshold deformation force is attained,
    wherein the frame deforms in an arcuate manner forming a concave shape on the continuous portion from the pressure exerted by the brush, the deformation increasing a distance between the protrusion and the ridge through radial elongation of the discontinuous portion.

2. The device of claim 1, wherein
    the protrusion on the percussion tip is configured to slidably pass the ridge upon attaining the threshold deformation force.

3. The device of claim 1, wherein the protrusion and the ridge are adapted to deform for overcoming the interference engagement upon attaining the threshold force.

4. The device of claim 1, wherein the annunciator is adapted to generate the signal based on disengagement of the discontinuous portion.

5. The device of claim 4, wherein the annunciator is adapted to detect a loss of contact of the discontinuous portion.

6. The device of claim 1, wherein the deformation of the continuous portion defines an arc, the deformation forcing the discontinuous portion outward from a circle defined by the arc.

7. The device of claim 6, wherein a tip of the discontinuous portion follows an outward force normal to a tangent to the circle.

* * * * *